(12) United States Patent
Hah et al.

(10) Patent No.: US 10,741,841 B2
(45) Date of Patent: Aug. 11, 2020

(54) ELECTRODE ACTIVE MATERIAL HAVING IMPROVED ENERGY DENSITY AND LITHIUM SECONDARY BATTERY INCLUDING THE SAME

(71) Applicant: LG Chem, Ltd., Seoul (KR)

(72) Inventors: Hoe Jin Hah, Daejeon (KR); Kyoung Ho Kim, Daejeon (KR); Il Hong Kim, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 861 days.

(21) Appl. No.: 14/787,992

(22) PCT Filed: Jul. 16, 2014

(86) PCT No.: PCT/KR2014/006419
§ 371 (c)(1),
(2) Date: Oct. 29, 2015

(87) PCT Pub. No.: WO2015/016506
PCT Pub. Date: Feb. 5, 2015

(65) Prior Publication Data
US 2016/0133929 A1    May 12, 2016

(30) Foreign Application Priority Data
Jul. 29, 2013 (KR) .................... 10-2013-0089858

(51) Int. Cl.
| | |
|---|---|
| *H01M 4/36* | (2006.01) |
| *H01M 4/58* | (2010.01) |
| *H01M 4/525* | (2010.01) |
| *H01M 4/505* | (2010.01) |
| *H01M 4/587* | (2010.01) |
| *H01M 4/38* | (2006.01) |
| *H01M 10/052* | (2010.01) |
| *H01M 4/62* | (2006.01) |
| *H01M 10/0525* | (2010.01) |

(52) U.S. Cl.
CPC ......... *H01M 4/5825* (2013.01); *H01M 4/364* (2013.01); *H01M 4/505* (2013.01); *H01M 4/525* (2013.01); *H01M 4/582* (2013.01); *H01M 4/366* (2013.01); *H01M 4/386* (2013.01); *H01M 4/587* (2013.01); *H01M 4/625* (2013.01); *H01M 10/052* (2013.01); *H01M 10/0525* (2013.01); *H01M 2220/30* (2013.01)

(58) Field of Classification Search
CPC ...... H01M 4/364; H01M 4/505; H01M 4/525; H01M 4/5825
See application file for complete search history.

(56) References Cited

U.S. PATENT DOCUMENTS

| | | | |
|---|---|---|---|
| 2010/0136433 A1 | 6/2010 | Kim et al. | |
| 2010/0181527 A1* | 7/2010 | Nesvadba | H01M 4/364 |
| | | | 252/182.1 |
| 2012/0052391 A1 | 3/2012 | Suzuki et al. | |
| 2012/0217435 A1 | 8/2012 | Yamamoto et al. | |
| 2012/0244419 A1 | 9/2012 | Kwak et al. | |
| 2012/0244432 A1 | 9/2012 | Park et al. | |
| 2012/0321955 A1 | 12/2012 | Yasuda et al. | |
| 2012/0326078 A1 | 12/2012 | Chung et al. | |
| 2013/0183583 A1 | 7/2013 | Kim et al. | |
| 2013/0260249 A1 | 10/2013 | Choi | |
| 2013/0273428 A1 | 10/2013 | Kawakami et al. | |
| 2014/0225031 A1 | 8/2014 | Yasuda et al. | |

FOREIGN PATENT DOCUMENTS

| | | |
|---|---|---|
| CN | 102055012 A | 5/2011 |
| CN | 102938458 A | 2/2013 |
| JP | H08171935 A | 7/1996 |
| JP | 2005149906 A | 6/2005 |
| JP | 2008098154 A | 4/2008 |
| JP | 2009009753 A | 1/2009 |
| JP | 2011096650 A | 5/2011 |
| JP | 2011171012 A | 9/2011 |
| JP | 2011228052 A | 11/2011 |
| JP | 2012048959 A | 3/2012 |
| JP | 2012129102 A | 7/2012 |
| JP | 2013075773 A | 4/2013 |
| JP | 2013093319 A | 5/2013 |
| JP | 2013214491 A | 10/2013 |

(Continued)

OTHER PUBLICATIONS

International Search Report for Application No. PCT/KR2014/006419 dated Oct. 15, 2014.

*Primary Examiner* — Ula C Ruddock
*Assistant Examiner* — Frank A Chernow
(74) *Attorney, Agent, or Firm* — Lerner, David, Littenberg, Krumholz & Mentlik, LLP

(57) ABSTRACT

Disclosed are an electrode active material having improved energy density and a lithium secondary battery including the same. More particularly, provided is an electrode active material including a first electrode active material and a second electrode active material, each of the first electrode active material and the second electrode active material having a composition represented by Formula (1) below, a ratio of lithium to metals in the first electrode active material being 1.4 to 1.7, and a ratio of lithium to metals in the second electrode active material being 1.2 or more and less than 1.4:

$$(1-x)LiM'O_{2-y}A_y - xLi_2MnO_{3-y'}A_{y'} \quad (1)$$

wherein M' is $Mn_aM_b$; M is at least one selected from the group consisting of Ni, Ti, Co, Al, Cu, Fe, Mg, B, Cr, Zr, Zn and Period II transition metals; A is at least one selected from the group consisting of anions such as $PO_4$, $BO_3$, $CO_3$, F and $NO_3$; $0<x<1$; $0<y\leq0.02$; $0<y'\leq0.02$; $0.5\leq a\leq1.0$; $0\leq b\leq0.5$; and $a+b=1$.

27 Claims, No Drawings

(56) References Cited

FOREIGN PATENT DOCUMENTS

| | | |
|---|---|---|
| JP | 2014509043 A | 4/2014 |
| KR | 10-2007-0105724 | 10/2007 |
| KR | 10-1063214 B1 | 9/2011 |
| KR | 20120095803 A | 8/2012 |
| KR | 10-2012-0109407 | 10/2012 |
| KR | 10-1215829 B1 | 12/2012 |
| KR | 10-2013-0000849 A | 1/2013 |
| WO | 2012115411 A2 | 8/2012 |
| WO | 2013179446 A1 | 12/2013 |

* cited by examiner

ELECTRODE ACTIVE MATERIAL HAVING IMPROVED ENERGY DENSITY AND LITHIUM SECONDARY BATTERY INCLUDING THE SAME

CROSS-REFERENCE TO RELATED APPLICATION

The present application is a national phase entry under 35 U.S.C. § 371 of International Application No. PCT/KR2014/006419, filed Jul. 16, 2014, which claims priority from Korean Application No. 10-2013-0089858, filed Jul. 29, 2013, all of which are incorporated herein by reference.

TECHNICAL FIELD

The present invention relates to an electrode active material having improved energy density and a lithium secondary battery including the same.

BACKGROUND ART

As mobile device technology continues to develop and demand therefor continues to increase, demand for secondary batteries as energy sources is rapidly increasing. Among these secondary batteries, lithium secondary batteries which exhibit high energy density and voltage, long lifespan and low self-discharge rate are commercially available and widely used.

As positive electrode active materials for such lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration.

$LiCoO_2$ is widely used due to excellent overall physical properties such as excellent cycle properties, and the like, but is low in safety. In addition, due to resource limitations of cobalt as a raw material, $LiCoO_2$ is expensive and massive use thereof as power sources in fields such as electric vehicles and the like is limited. Due to characteristics of preparation methods of $LiNiO_2$, it is difficult to massively produce $LiNiO_2$ at reasonable expense.

On the other hand, lithium manganese oxides, such as $LiMnO_2$, $LiMn_2O_4$, and the like, are advantageous in that they contain Mn, which is an abundant and environmentally friendly raw material, and thus are drawing much attention as a positive electrode active material that can replace $LiCoO_2$. However, such lithium manganese oxides also have disadvantages such as poor cycle characteristics and the like.

First, $LiMnO_2$ has disadvantages such as a low initial capacity and the like. In particular, $LiMnO_2$ requires dozens of charge and discharge cycles until a constant capacity is reached. In addition, capacity reduction of $LiMn_2O_4$ becomes serious with increasing number of cycles, and, at particularly high temperature of 50° C. or more, cycle characteristics are rapidly deteriorated due to decomposition of an electrolyte solution, elution of manganese and the like.

Meanwhile, as lithium-containing manganese oxides, there is $Li_2MnO_3$ in addition to $LiMnO_2$ and $LiMn_2O_4$. Since structural stability of $Li_2MnO_3$ is excellent but it is electrochemically inactive, $Li_2MnO_3$ itself cannot be used as a positive electrode active material of secondary batteries. Therefore, some prior technologies suggest a technology of using a solid solution of $Li_2MnO_3$ and $LiMO_2$ (M=Co, Ni, $Ni_{0.5}Mn_{0.5}$, Mn) as a positive electrode active material. In such a positive electrode active material solid solution, Li and O are separated from a crystal structure at a high voltage of 4.5 V and, thus, electrochemical activity is exhibited. However, there are problems such as high possibility of electrolyte solution decomposition and gas generation at high voltage, and massive use of relatively expensive materials such as $LiMO_2$ (M=Co, Ni, $Ni_{0.5}Mn_{0.5}$, Mn) and the like.

In addition, due to structural characteristics of lithium-containing manganese oxide crystals, it is difficult to guarantee desired stability and limited to anticipate improvement of energy density.

Therefore, there is an urgent need for technology to resolve such problems.

DISCLOSURE

Technical Problem

Therefore, the present invention has been made to solve the above and other technical problems that have yet to be resolved.

The present invention aims to provide an electrode active material having improved high-voltage stability and energy density and a lithium secondary battery including the same.

Technical Solution

Therefore, in a non-limiting embodiment of the present invention, an electrode active material includes a first electrode active material and a second electrode active material, each of the first electrode active material and the second electrode active material having a composition represented by Formula (1) below, a molar ratio of lithium to metals in the first electrode active material being 1.4:1 to 1.7:1, and a molar ratio of lithium to metals in the second electrode active material being 1.2:1 or more and less than 1.4:1:

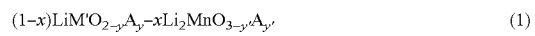

$$(1-x)LiM'O_{2-y}A_y - xLi_2MnO_{3-y'}A_{y'} \quad (1)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$; and $0<x<1$; $0 \leq y \leq 0.02$; $0 \leq y' \leq 0.02$; $0.5 \leq a \leq 1.0$; $0 \leq b \leq 0.5$; and $a+b=1$.

Mol % of manganese (Mn) in the first electrode active material may be 60 mol % to 80 mol % with respect to mol % of total metals, and mol % of manganese (Mn) in the second electrode active material may be greater than 30 mol % and less than 60 mol % with respect to mol % of total metals.

The second electrode active material includes a third electrode active material in which mol % of manganese (Mn) is greater than 30 mol % and less than 50 mol % with respect to mol % of total metals.

The second electrode active material includes a fourth electrode active material in which mol % of manganese (Mn) is greater than 40 mol % and less than 60 mol % with respect to mol % of total metals.

The second electrode active material includes a third electrode active material and a fourth electrode active material, and a weight ratio of the third electrode active material and to fourth electrode active material may be 5:95 to 95:5.

A weight ratio of the first electrode active material to the second electrode active material may be 5:95 to 95:5.

An average particle diameter (D50) of the first electrode active material may be 3 μm to 20 μm.

An average particle diameter (D50) of the second electrode active material may be 3 μm to 20 μm.

An average particle diameter (D50) of the third electrode active material may be 3 μm to 20 μm, and an average particle diameter (D50) of the fourth electrode active material may be 3 μm to 20 μm.

The first electrode active material may have a globular shape, an oval shape, a spindle shape, a scale shape, a fiber shape, a stick shape, a core-shell shape or an amorphous shape.

The second electrode active material may has a globular shape, an oval shape, a spindle shape, a scale shape, a fiber shape, a stick shape, a core-shell shape or an amorphous shape.

The first electrode active material may further include a conductive coating layer present in a surface, and a thickness of the conductive coating layer may be 0.1 nm to 100 nm.

The second electrode active material may further include a conductive coating layer present in a surface, and a thickness of the conductive coating layer may be 0.1 nm to 100 nm.

The third electrode active material may further include a conductive coating layer present in a surface, and a thickness of the conductive coating layer may be 0.1 nm to 100 nm.

The fourth electrode active material may further include a conductive coating layer present in a surface, and a thickness of the conductive coating layer may be 0.1 nm to 100 nm.

The first electrode active material may include second particles composed of first particles, and porosity of the second particles may be 1% to 50%.

The second electrode active material may include second particles composed of first particles, and porosity of the second particles may be 1% to 50%.

The third electrode active material may include second particles composed of first particles, and porosity of the second particles may be 1% to 50%.

The fourth electrode active material may include second particles composed of first particles, and porosity of the second particles may be 1% to 50%.

The conductive coating layer may include one or more conductive particles.

The conductive coating layer may include conductive carbon black.

The conductive carbon black may be at least one selected from the group consisting of acetylene black, Ketjen black, furnace black, oil-furnace black, Columbia carbon, channel black, lamp black and thermal black.

In addition, the present invention may provide a lithium secondary battery including the electrode active material as a positive electrode active material.

The lithium secondary battery may include a carbon based material and/or Si as a negative electrode active material.

The lithium secondary battery may be one selected from the group consisting of a lithium ion battery, a lithium ion polymer battery and a lithium polymer battery.

In general, the positive electrode is prepared by drying after coating a mixture of a positive electrode active material, a conductive material and a binder, as an electrode mixture, on a positive electrode current collector. In this case, as desired, the mixture may further include a filler.

Examples of the positive electrode active material may include, in addition to the electrode active material represented by Formula 1, layered compounds such as lithium cobalt oxide ($LiCoO_2$) and lithium nickel oxide ($LiNiO_2$) or compounds substituted with one or more transition metals; lithium manganese oxides represented by $Li_{1+x}Mn_{2-x}O_4$ where $0 \leq x \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-x}M_xO_2$ where M=Co, Mn, Al, Cu, Fe, Mg, B, or Ga, and $0.01 \leq x \leq 0.3$; lithium manganese composite oxides having the formula $LiMn_{2-x}M_xO_2$ where M=Co, Ni, Fe, Cr, Zn, or Ta, and $0.01 \leq x \leq 0.1$ or the formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some of the Li atoms are substituted with alkaline earth metal ions; disulfide compounds; $Fe_2(MoO_4)_3$; and the like, but embodiments of the present invention are not limited thereto.

The positive electrode current collector is generally fabricated to a thickness of 3 to 500 μm. The positive electrode current collector is not particularly limited so long as it does not cause chemical changes in the fabricated lithium secondary battery and has high conductivity. For example, the positive electrode current collector may be made of stainless steel, aluminum, nickel, titanium, sintered carbon, aluminum or stainless steel surface-treated with carbon, nickel, titanium, or silver, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is generally added in an amount of 1 to 50 wt % with respect to the total weight of a mixture including a positive electrode active material. Such a conductive material is not specifically limited so long as it does not cause chemical changes in the fabricated battery and has conductivity. For example, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide whiskers and potassium titanate whiskers; conductive metal oxides such as titanium oxide; conductive materials such as polyphenylene derivatives; and the like may be used.

Meanwhile, a graphite based material having elasticity may be used as a conductive material and may be used with the materials listed above.

The binder is a component assisting in binding between an active material and the conductive material and in binding of the active material to a current collector. The binder is typically added in an amount of 1 to 50 wt % based on the total weight of the mixture including the positive electrode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The present invention also provides a secondary battery including the electrode, and the secondary battery may be a lithium ion battery, a lithium ion polymer battery, or a lithium polymer battery.

In general, the lithium secondary batteries include a positive electrode, a negative electrode, a separator disposed between the positive electrode and the negative electrode, and a lithium salt-containing non-aqueous electrolyte. The other components of the lithium secondary batteries will be described below.

The negative electrode may be prepared by coating, drying and pressing a negative electrode active material on a negative electrode current collector. As desired, the conductive material, the binder, the filler and the like described above may be selectively further included.

Examples of the negative electrode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and the negative electrode active material and may be used in various forms including films, sheets, foils, nets, porous structures, foams, and non-woven fabrics.

The separator is disposed between the positive electrode and the negative electrode and, as the separator, a thin insulating film with high ion permeability and high mechanical strength is used. The separator generally has a pore diameter of 0.01 to 10 μm and a thickness of 5 to 300 μm. As the separator, for example, sheets or non-woven fabrics, made of an olefin-based polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of a non-aqueous electrolyte and lithium. As the non-aqueous electrolyte, a non-aqueous organic solvent, an organic solid electrolyte, an inorganic solid electrolyte or the like may be used, but the present invention is not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$ The lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the lithium salt-containing non-aqueous electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, and fluoro-ethylene carbonate (FEC), propene sultone (PRS) and the like may be further included.

In one specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent including EC or PC, which is a high dielectric solvent and a cyclic carbonate, and DEC, DMC, or EMC, which is a low viscosity solvent and a linear carbonate.

The present invention may provide a device using the lithium secondary battery as a battery pack and the battery pack as an energy source.

In this regard, particular examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

MODE FOR INVENTION

Now, the present invention will be described in more detail with reference to the accompanying drawings. These examples are provided for illustrative purposes only and should not be construed as limiting the scope and spirit of the present invention.

Example 1

As a lithium manganese based oxide including Mn as an essential transition metal and having a layered crystal structure, $0.5Li_2MnO_3 \cdot 0.5Li(Ni_{0.45}Mn_{0.35}Ni_{0.20})O_2$, in which a molar ratio of lithium to metals is 1.5:1, and $0.25Li_2MnO_3 \cdot 0.75Li(Ni_{0.45}Mn_{0.40}Ni_{0.15})O_2$, in which a molar ratio of lithium to metals is 1.25:1, were mixed in a weight ratio of 1:1, thereby preparing a positive electrode active material.

The positive electrode active material, a conductive material and a binder were mixed in a ratio of 90:5:5 to prepare a slurry, and the prepared slurry was coated on Al-foil to a thickness of 20 µm. Subsequently, a coin type battery and single-layer pouch type battery were manufactured. Artificial graphite was used as a negative electrode and an electrolyte solution was prepared by adding 1 M $LiPF_6$ to a mixture of EC and EMC mixed in 1:2 including 2 wt % $LiBF_4$.

Example 2

A coin type battery or a single-layer pouch type battery was prepared in the same manner as in Example 1, except that a positive electrode active material was prepared by mixing $0.5Li_2MnO_3 \cdot 0.5Li(Ni_{0.45}Mn_{0.35}Ni_{0.20})O_2$, in which a molar ratio of lithium to metals is 1.5:1, and $0.25Li_2MnO_3 \cdot 0.75Li(Ni_{0.45}Mn_{0.40}Ni_{0.15})O_2$, in which a molar ratio of lithium to metals is 1.25:1, in a weight ratio of 7:3, instead of the mixture of the positive electrode active material.

Comparative Example 1

A coin type battery or a single-layer pouch type battery was prepared in the same manner as in Example 1, except that a positive electrode active material was prepared using only a three-component system lithium oxide of $Li(Ni_{0.33}Mn_{0.33}Ni_{0.33})O_2$ not having a $Li_2MnO_3$ phase, instead of the mixture of the positive electrode active material.

Comparative Example 2

A coin type battery or a single-layer pouch type battery was prepared in the same manner as in Example 1, except that a positive electrode active material was prepared using only a lithium manganese based oxide of $0.5Li_2MnO_3 \cdot 0.5Li(Ni_{0.45}Mn_{0.35}Ni_{0.20})O_2$ in which a molar ratio of lithium to metals was 1.5:1, instead of the mixture of the positive electrode active material.

Experimental Example 1

To the coin-type battery manufactured according to each of Examples 1 and 2, and Comparative Examples 1 and 2, a current of 0.1 C-rate in a voltage range of 2.75 to 4.65 V was applied to test initial capacity characteristics. In addition, a current of 0.5 C-rate was applied in a voltage range of 2.75 to 4.65 V and a capacity characteristic test according to the rate was carried out. In this regard, each capacity characteristic is summarized in Table 1 below.

Experimental Example 2

Output characteristics of the single-layer pouch type battery manufactured according to each of Examples 1 and 2, and Comparative Example 2 were tested in a voltage range of 3.0 to 4.35 V under a condition of 10 sec pulse. In this regard, each output characteristic at SOC20 is summarized in Table 2.

Experimental Example 3

Lifespan characteristics of each of the single-layer pouch type battery manufactured according to each of Examples 1 and 2, and Comparative Example 2 were tested by applying a current of 0.5/1.0 C-rate at 45° C. in a voltage range of 3.0 to 4.35 V. In this regard, lifespan characteristics were evaluated by a maintenance ratio with respect to initial capacity after proceeding 300 cycles. Results are summarized in Table 3 below.

TABLE 1

|  | 0.1 C capacity (2.75-4.65 V) (mAh/g) | 0.5 C capacity (2.75-4.4 V) (mAh/g) |
|---|---|---|
| Example 1 | 260 | 188 |
| Example 2 | 268 | 189 |
| Comparative Example 1 | 193 | 161 |
| Comparative Example 2 | 275 | 192 |

TABLE 2

|  | Power at SOC20 (mW) |
|---|---|
| Example 1 | 735 |
| Example 2 | 470 |
| Comparative Example 2 | 173 |

TABLE 3

|  | Lifespan characteristics (capacity at 300th cycle with respect to initial capacity, %) |
|---|---|
| Example 1 | 85 |
| Example 2 | 82 |
| Comparative Example 2 | 70 |

As shown in Table 1, it can be confirmed that the batteries according to Examples 1 and 2, in which the electrode active material according to Formula 1 was mixed and used, exhibit a 2.5 to 5.5% lower 0.1 C capacity value and a 1.5 to 2% lower 0.5 C capacity, when compared with the case of using only the electrode active material.

As shown in Table 2, it can be confirmed that the batteries according to Examples 1 and 2, in which the electrode active material according to Formula 1 was mixed and used, exhibit 2.7 to 4 times higher output characteristics, when compared with the case of using only the electrode active material.

As shown in Table 3, it can be confirmed that the batteries according to Examples 1 and 2, in which the electrode active material according to Formula 1 was mixed and used, exhibit dramatically improved lifespan characteristics, when compared with the case using only the electrode active material. This is since the lithium manganese based oxides, in which molar ratios of lithium to metals were 1.4:1 to 1.7:1 and 1.2:1 or more and less than 1.4:1 respectively, were mixed and used in the lithium manganese based oxide according to Formula 1, and thus, improved energy density, resistance reduction and output improvement in a low SOC area by combining advantages of each of the electrode active materials, and improved lifespan characteristics may be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode active material according to the present invention may provide an electrode active material having improved high-voltage stability and energy density, and a lithium secondary battery including the same.

The invention claimed is:

1. An electrode active material comprising a first electrode active material and a second electrode active material, wherein each of the first electrode active material and the second electrode active material has a composition represented by Formula (1) below, a molar ratio of lithium to metals in the first electrode active material is 1.4:1 to 1.7:1, and a molar ratio of lithium to metals in the second electrode active material is 1.2:1 or more and less than 1.4:1:

$$(1-x)LiM'O_{2-y'}A_{y'}-xLi_2MnO_{3-y'}A_{y'} \quad (1)$$

wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$;

$0<x<1$; $0<y\leq0.02$; $0<y'\leq0.02$; $0.5\leq a\leq1.0$; $0\leq b\leq0.5$; and $a+b=1$.

2. The electrode active material according to claim 1, wherein a molar amount of manganese (Mn) in the first electrode active material is 60 mol % to 80 mol % with respect to a total molar amount of the metals in the first electrode active material, and a molar amount of manganese (Mn) in the second electrode active material is greater than 30 mol % and less than 60 mol % with respect to a total molar amount of the metals in the second electrode active material.

3. The electrode active material according to claim 2, wherein, in $LiM'O_{2-y}A_y$ of the second electrode active material, a molar amount of manganese (Mn) is greater than 40 mol % and less than 60 mol % with respect to a total molar amount of M' in $LiM'O_{2-y}A_y$ of the second electrode active material.

4. The electrode active material according to claim 2, wherein a weight ratio of $Li_2MnO_{3-y'}A_{y'}$ to the $LiM'O_{2-y}A_y$ in the second electrode active material being 5:95 to 95:5.

5. The electrode active material according to claim 1, wherein a weight ratio of the first electrode active material to the second electrode active material is 5:95 to 95:5.

6. The electrode active material according to claim 1, wherein an average particle diameter (D50) of the first electrode active material is 3 μm to 20 μm.

7. The electrode active material according to claim 1, wherein an average particle diameter (D50) of the second electrode active material is 3 μm to 20 μm.

8. The electrode active material according to claim 4, wherein an average particle diameter (D50) of $Li_2MnO_{3-y'}A_{y'}$ of the second electrode active material is 3 μm to 20

μm, and an average particle diameter (D50) of $LiM'O_{2-y}A_y$ of the second electrode active material is 3 μm to 20 μm.

9. The electrode active material according to claim 1, wherein the first electrode active material has a globular shape, an oval shape, a spindle shape, a scale shape, a fiber shape, a stick shape, a core-shell shape or an amorphous shape.

10. The electrode active material according to claim 1, wherein the second electrode active material is a globular shape, an oval shape, a spindle shape, a scale shape, a fiber shape, a stick shape, a core-shell shape or an amorphous shape.

11. The electrode active material according to claim 1, wherein the first electrode active material further comprises a conductive coating layer present in a surface, a thickness of the conductive coating layer being 0.1 nm to 100 nm.

12. The electrode active material according to claim 1, wherein the second electrode active material further comprises a conductive coating layer present in a surface, a thickness of the conductive coating layer being 0.1 nm to 100 nm.

13. The electrode active material according to claim 4, wherein $Li_2MnO_{3-y'}A_{y'}$ of the second electrode active material further comprises a conductive coating layer present in a surface, a thickness of the conductive coating layer being 0.1 nm to 100 nm.

14. The electrode active material according to claim 4, wherein $LiM'O_{2-y}A_y$ of the second electrode active material further comprises a conductive coating layer present in a surface, a thickness of the conductive coating layer being 0.1 nm to 100 nm.

15. The electrode active material according to claim 1, wherein the first electrode active material is in the form of secondary particles composed of primary particles, porosity of the secondary particles being 1% to 50%.

16. The electrode active material according to claim 1, wherein the second electrode active material is in the form of secondary particles composed of primary particles, porosity of the secondary particles being 1% to 50%.

17. The electrode active material according to claim 4, wherein $Li_2MnO_{3-y'}A_{y'}$ of the second electrode active material is in the form of secondary particles composed of primary particles, porosity of the secondary particles being 1% to 50%.

18. The electrode active material according to claim 4, wherein $LiM'O_{2-y}A_y$ of the second electrode active material is in the form of secondary particles composed of primary particles, porosity of the secondary particles being 1% to 50%.

19. The electrode active material according to claim 11, wherein the conductive coating layer comprises one or more conductive particles.

20. The electrode active material according to claim 19, wherein the conductive coating layer comprises conductive carbon black.

21. The electrode active material according to claim 20, wherein the conductive carbon black is at least one selected from the group consisting of acetylene black, Ketjen black, furnace black, oil-furnace black, Columbia carbon, channel black, lamp black and thermal black.

22. A lithium secondary battery comprising the electrode active material according to claim 1 as a positive electrode active material.

23. The lithium secondary battery according to claim 22, comprising a carbon based material and/or Si as a negative electrode active material.

24. The lithium secondary battery according to claim 22, wherein the lithium secondary battery is one selected from the group consisting of a lithium ion battery, a lithium ion polymer battery and a lithium polymer battery.

25. A battery pack comprising the lithium secondary battery according to claim 22.

26. A device using the battery pack according to claim 25 as an energy source.

27. The electrode active material of claim 1, wherein the molar ratio of lithium to metals in the second electrode active material is 1.2:1 or more 1.25:1.

* * * * *